United States Patent [19]

Watanabe et al.

[11] Patent Number: 5,024,892
[45] Date of Patent: * Jun. 18, 1991

[54] MAGNETIC RECORDING MEDIUM HAVING A BINDER COMPRISING A COPOLYMER WHICH INCLUDES A VINYL COMPOUND HAVING A DIALKYLAMINOALKYL GROUP

[75] Inventors: Hideomi Watanabe; Tsutomu Okita, both of Kanagawa, Japan

[73] Assignee: Fuji Photo Film Co., Ltd., Kanagawa, Japan

[*] Notice: The portion of the term of this patent subsequent to Nov. 14, 2006 has been disclaimed.

[21] Appl. No.: 192,036

[22] Filed: May 9, 1988

[30] Foreign Application Priority Data

May 8, 1987 [JP] Japan .............................. 62-112084
May 8, 1987 [JP] Japan .............................. 62-112086

[51] Int. Cl.$^5$ ............................................. G11B 23/00
[52] U.S. Cl. ............................... 428/423.1; 428/425.9; 428/694; 428/900
[58] Field of Search ................... 428/900, 694, 425.9, 428/423.1

[56] References Cited

U.S. PATENT DOCUMENTS 3,864,133  2/1975  Hisamatsu et al. ............... 96/115 P
4,004,997  1/1977  Tsukamoto et al. ........... 204/159.14
4,556,611  12/1985 Nakajima ............................ 428/694
4,560,616  12/1985 Okita et al. ....................... 428/423.1
4,770,941  9/1988  Imai et al. ......................... 428/411.1
4,784,913  11/1988 Nakamura et al. ............... 428/411.1
4,880,692  11/1989 Ryoke et al. ....................... 428/323

Primary Examiner—Merrell C. Cashion, Jr.
Assistant Examiner—Stevan A. Resan
Attorney, Agent, or Firm—Sughure, Mion, Zinn Macpeak & Seas

[57] ABSTRACT

A magnetic recording medium comprising a non-magnetic support having provided thereon a magnetic layer, containing ferromagnetic particles dispersed in a binder, wherein the binder comprises a copolymer comprising at least one vinyl compound having a dialkylaminoalkyl group and at least one copolymerizable vinyl monomer capable of being copolymerized with the vinyl compound.

15 Claims, No Drawings

MAGNETIC RECORDING MEDIUM HAVING A BINDER COMPRISING A COPOLYMER WHICH INCLUDES A VINYL COMPOUND HAVING A DIALKYLAMINOALKYL GROUP

FIELD OF THE INVENTION

The present invention relates to a magnetic recording medium such as a video tape, an audio tape, a computer tape, or a floppy disk.

BACKGROUND OF THE INVENTION

The binders used for a magnetic recording medium generally include vinyl chloride type binders such as a vinyl chloride/vinyl acetate copolymer, a vinyl chloride/propionic acid copolymer, a vinyl chloride/vinyl acetate/vinyl alcohol copolymer, and the like. Among those binders, a vinyl chloride/vinyl acetate/vinyl alcohol copolymer is widely used because hydroxyl groups of the vinyl alcohol units provide good dispersibility of ferromagnetic particles and the active hydrogen atoms of the hydroxyl groups react with isocyanate compound to form a crosslinked structure, thereby increasing the mechanical strength of the coated film.

In recent years, because the specific surface area of the magnetic particles has been increased as a result of making the magnetic particles finer and the aggregating force of the magnetic particles has been increased as a result of making the coercive force higher, the above described binders have not been able to provide satisfactory dispersibility and surface properties of the coated film. Thus, it has become difficult to increase the packing density of the ferromagnetic particles. Also, the durability, the magnetic characteristics and the electromagnetic properties of the magnetic recording medium are also insufficient.

It has been proposed to use, for example, a surface active agent as a dispersing agent. However, with respect to the surface active agent used, problems have arisen with the mechanical strength and the durability of the medium because since the surface active agent is a low molecular weight compound, powder drop out and blooming have been caused with the passage of time.

Under the circumstances described above, binders capable of improving the above properties of magnetic recording medium have been desired. It has been proposed to use a vinyl chloride/vinyl acetate copolymer or a vinyl chloride/vinyl acetate/vinyl alcohol copolymer as a binder in which a sulfonic acid group or its alkaline metal salt, a sulfuric acid group or its alkaline metal salt, a carboxyl group or its metallic salt, and the like is introduced into the side chain of the copolymers.

These binders can improve the dispersibility to some extent when compared with the conventional binders having no polar group, but even this improvement is insufficient for magnetic particles having extremely fine particle size and those having higher coercive force.

In recent years, magnetic recording mediums have been required to have high image and audio quality. In order to realize high image quality, it is necessary to closely contact the surface of a magnetic layer with a video head or an audio head. Therefore, it is important not only to improve surface smoothness of a magnetic recording medium but also to improve the dispersibility of ferromagnetic particles.

On the other hand, as the smoothness of a magnetic layer is increased, the friction on the running systems of a video tape recorder increases, thereby increasing static charge and the tension of the running tape. Under those harsh conditions, sufficient running durability has become much more necessary for magnetic recording mediums.

Hithertofore, a magnetic recording medium which is provided with a satisfactory surface smoothness of the magnetic layer, good dispersibility of ferromagnetic particles, and good running durability could not be obtained by a conventional magnetic recording medium.

SUMMARY OF THE INVENTION

The present inventors have studied the use of thermoplastic resins and thermosetting resins as a binder, the addition of the above described crosslinkable binders, and the use of binders capable of being hardened by radiation exposure, and as a result of extensive research to avoid the defects of the conventional binders, the present inventors have attained the present invention.

Accordingly, an object of the present invention is to provide a magnetic recording medium having excellent characteristics which the conventional magnetic recording medium do not have, that is, (1) excellent electromagnetic characteristics, (2) excellent dispersibility of ferromagnetic particles, (3) reduced static charge of a magnetic layer upon running, (4) excellent running properties and reduced drop outs, and (5) excellent running durability.

Other objects of the present invention will be apparent from the following description.

The objects of the present invention can be attained by a magnetic recording medium comprising a non-magnetic support having provided thereon a magnetic layer comprising ferromagnetic particles dispersed in a binder, wherein the binder comprises a copolymer comprising at least one vinyl compound having a dialkylaminoalkyl group and at least one copolymerizable vinyl monomer capable of being copolymerized with the vinyl compound.

DETAILED DESCRIPTION OF THE INVENTION

High affinity between ferromagnetic particles and binders can be assured by using the above described copolymer as a binder.

A preferred embodiment of the present invention is that the magnetic layer contains a copolymer composed of at least one vinyl compound having a dialkylaminoalkyl group, vinyl chloride, and at least one copolymerizable vinyl monomer capable of being copolymerized with the vinyl compound.

Another preferred embodiment of the present invention is that the magnetic layer contains a conventional vinyl chloride type copolymer and a urethanetype polymer in addition to the above copolymer.

In accordance with the above described preferred embodiments, a magnetic recording medium having much better dispersibility of ferromagnetic particles, much better surface smoothness of the magnetic layer, and much better running durability can be obtained.

The vinyl compound containing a dialkylaminoalkyl group used in the present invention is preferably represented by formula (I):

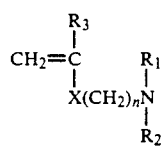

(I)

wherein n represents an integer of from 1 to 4; $R_1$ and $R_2$ each represents a hydrogen atom or an alkyl group having from 1 to 6 carbon atoms; X represents —CONH—, —NHCONH—, or —NHCO$_2$—; and $R_3$ represents a hydrogen atom or a methyl group.

Accordingly, the copolymer used in the present invention is preferably represented by the formula (II).

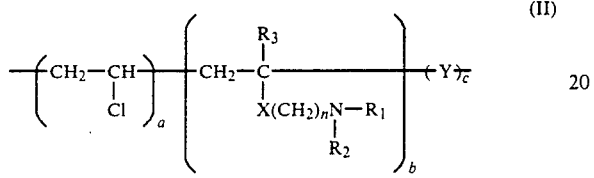

(II)

wherein n, $R_1$, $R_2$, $R_3$, and X each has the same meaning as in formula (I); Y represents a copolymerizable vinyl monomer capable of being copolymerized with the vinyl compound having a dialkylaminoalkyl group; and a, b, and c each represents an amount ratio of each unit of the copolymer described later.

Although formula (II) is expediently illustrated so that each component composing the formula aligns orderly and regularly, each component in a certain ratio may be regularly repeated or may be aligned at random.

The vinyl compound containing a dialkylaminoalkyl group and the copolymerizable vinyl monomer represented by Y each may contain two or more kinds thereof.

Preferred examples of the vinyl compound having a dialkylaminoalkyl group used in the present invention include those wherein the alkylamino group is bonded to the main chain through —CONH— after polymerization, that is, those wherein X in formula (I) is —CONH—.

Particularly preferred examples thereof are shown below.

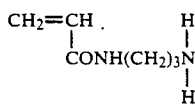

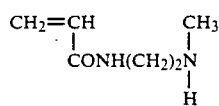

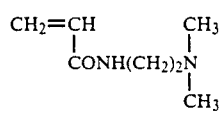

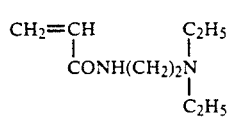

-continued

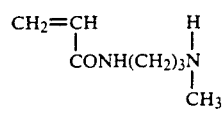

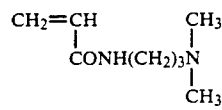

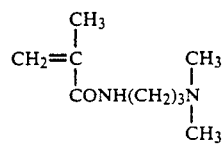

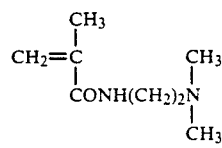

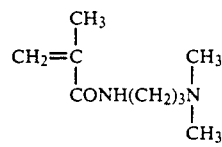

Examples of the copolymerizable vinyl monomer represented by Y include vinyl acetate, vinyl alcohol, maleic acid, maleic anhydride, acrylic acid, acrylates, methacrylic acid, methacrylates, esters of acrylic acid or methacrylic acid containing a glycidyl group, acrylonitrile, vinylidene chloride, and vinyl propionate. Among these, acrylates, methacrylates, and vinyl acetate are preferred. These monomers may be used singly or in combination.

The vinyl compound having a dialkylaminoalkyl group is contained in the copolymer of the present invention preferably in an amount of from 0.5 to 50 wt%, more preferably from 1 to 40 wt%, and most preferably from 2 to 30 wt% based on the total amount of the copolymer. The content of the component represented by Y is preferably from 50 to 99.5 wt%, more preferably from 60 to 99 wt%, and most preferably from 70 to 98 wt%, based on the total amount of the copolymer.

When the copolymer of the present invention contains vinyl chloride, the vinyl chloride component is contained in the copolymer in an amount of preferably from 75 to 98 wt% based on the total amount of the copolymer. When the vinyl chloride content is outside the above range, solubility and coating property decrease. The content of the compound having a dialkylaminoalkyl group is preferably from 0.01 to 15 wt%, more preferably from 0.1 to 10 wt%, and most preferably from 0.5 to 5 wt% based on the total amount of the copolymer.

At this time, the component represented by Y is copolymerized to improve the solubility, the coating property, and the adhesiveness of the binder with a support, and is preferably contained in an amount of from 0.5 to 20 wt% based on the total amount of the copolymer.

The molecular weight of the copolymer is preferably from about 10,000 to about 50,000, and more preferably from about 15,000 to about 30,000.

The copolymer is contained in an amount of preferably from 5 to 90 wt%, more preferably from 10 to 80 wt%, and most preferably from 20 to 60 wt% based on the total amount of the binders contained in the magnetic layer.

The copolymer used in the present invention may be used in combination with other binders. Examples of such binders include those conventionally used as binders for a magnetic recording medium, such as a vinyl chloride/vinyl acetate copolymer, a vinyl chloride/vinyl acetate/vinyl alcohol copolymer, a vinyl chloride/vinyl acetate/maleic acid copolymer, a vinyl chloride/vinylidene chloride copolymer, a vinyl chloride/acrylonitrile copolymer, an acrylate/acrylonitrile copolymer, an acrylate/vinylidene chloride copolymer, a methacrylate/vinylidene chloride copolymer, a methacrylate/styrene copolymer, thermoplastic polyurethane resins, phenoxy resins, polyvinyl fluoride, a vinylidene chloride/acrylonitrile copolymer, a butadiene/acrylonitrile copolymer, an acrylonitrile/butadiene/methacrylic acid copolymer, polyvinyl butyral, cellulose derivatives, a styrene/butadiene copolymer, polyester resins, phenol resins, epoxy resins, thermosetting polyurethane resins, urea resins, melamine resins, alkyl resins, urea/formaldehyde resins, and the mixtures thereof.

The durability and the running property of the magnetic recording medium can be greatly improved particularly by the use of vinyl chloride type resins and polyurethane resins in combination with the copolymer of the present invention. The static charging property and the magnetic characteristics of the magnetic recording medium are more greatly improved by adding the copolymer of the present invention to the binder system using these resins in combination than the case where those resins are not used in combination but one of them used separately.

When the copolymer of the present invention contains vinyl chloride, preferred examples of other binders to be used in combination therewith include polyurethane resins, polyester resins, and acrylonitrile/ butadiene copolymer which provide flexibility of the magnetic layer.

The durability of the medium can further be improved by using crosslinking agents such as, for example, 3-functional isocyanate compounds or a reaction product of 1 mole of trimethylol propane and 3 moles of tolylenediisocyanate. The amount of the crosslinking agent is preferably from 5 to 40 wt%, more preferably from 10 to 35 wt%, and most preferably from 15 to 25 wt% based on the total amount of the binder.

Examples of the ferromagnetic particles used in the present invention include ferromagnetic iron oxide particles, Co-doped ferromagnetic iron oxide particles, ferromagnetic chromium dioxide particles, ferromagnetic alloy particles, and barium ferrite. The ferromagnetic iron oxide and chromium dioxide preferably have an acicular ratio of about from 2/1 to 20/1, preferably 5/1 or more, and an average length of from about 0.2 to 2.0 μm. The ferromagnetic alloy particles preferably have a metal content of 75 wt% or more, of which 80 wt% or more of the is preferably a ferromagnetic metal (e.g., Fe, Co, Ni, Fe-Ni, Co Ni, Fe-Co-Ni), and the particles have a long axis of about 1.0 μm or less. Particularly effective ferromagnetic particles in the present invention are those having a BET specific surface area of 30 m²/g or more, preferably 45 m²/g or more which are difficult to disperse. The ratio of the amount of the ferromagnetic particles to the amount of the binder in the magnetic layer is preferably from 20/1 to 1/1, and more preferably from 10/1 to 2/1.

Examples of the organic solvents used for dispersing and coating a magnetic coating composition include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; ethers such as glycol dimethyl ether, glycol monoethyl ether, dioxane, or tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin, or dichlorobenzene.

Additives such as lubricating agents, abrasive agents, dispersing agents, antistatic agents, and rust preventing agents may be added to the magnetic coating composition of the present invention. Particularly, examples of the lubricating agents include saturated and unsaturated higher fatty acid, fatty acid ester, higher fatty acid amides, and higher alcohols having 12 or more carbon atoms, silicon oils, mineral oils, vegetable oils, and fluoride-type compounds. These lubricating agents may be added upon preparing the magnetic coating composition or may be coated or sprayed onto the surface of the magnetic layer after drying with or without dissolving these agents in an organic solvent.

The dry thickness of the magnetic layer is preferably 10 μm or less, and more preferably from 0.5 to 5 μm.

Examples of the support materials to be coated with the magnetic coating composition include polyesters such as polyethylene terephthalate or polyethylene 2,6naphthalate; polyolefins such as polyethylene or polypropylene; cellulose derivatives such as cellulose triacetate; plastics such as polycarbonate, polyimide, or polyamideimide; non-magnetic metals such as aluminum, copper, tin, or zinc; non-magnetic alloys containing the above metals; and plastics vapour-deposited with metals such as aluminum.

The non-magnetic support can be in the shape of a film, a tape, a sheet, a disk, a card or a drum; the materials are selected depending upon the shape.

A backing layer may be provided on the opposite surface of a support to the magnetic layer to prevent charging, print through and wow flutter as well as to improve the strength of a magnetic recording medium and to make the surface of the backing layer matted.

The present invention will be illustrated in more detail by referring to the following Examples and Comparative Examples but is not limited thereto. In the Examples and Comparative Examples, all parts, percents, ratios, etc. are by weight.

EXAMPLES 1 to 6 AND COMPARATIVE EXAMPLES 1 AND 2

The magnetic coating composition having the following formulation was mixed and kneaded in a ball mill for 50 hours.

| | |
|---|---|
| Ferromagnetic Fe alloy particles (Coercive force 1,500 Oe, BET specific surface area 50 m²/g) | 100 parts |
| Vinyl chloride/vinyl acetate/vinyl alcohol Copolymer ("VAGH", a trade | 8 parts |

-continued

| name, manufactured by Union Carbide Co., Ltd.) | |
|---|---|
| Copolymer containing a dialkylaminoalkyl group (see Table 1) | 3 parts |
| Polyurethane resin ("N2304", a trade name, manufactured by Nippon Polyurethane Co., Ltd.) | 5 parts |
| Stearic acid | 1 part |
| Butyl stearate | 1 part |
| $Al_2O_3$ (average particle size; 0.6 μm) | 2 parts |
| Carbon black (average particle size; 150 mμ) | 2 parts |
| Methyl ethyl ketone | 120 parts |
| Toluene | 100 parts |

After the above composition was mixed and kneaded, 5 parts of "Collonate L", a trade name of polyisocyanate, manufactured by Nippon Polyurethane Co., Ltd., was added thereto and further mixed and kneaded in a ball mill for 10 minutes. The resulting coating composition was coated onto a polyethylene terephthalate support having a 10 μm thickness using a doctor blade so that the dry thickness of the magnetic layer was 4 μm.

The magnetic layer was subjected to magnetic orientation using cobalt magnets, the solvents were dried, and the magnetic layer was subjected to a calendering treatment and then hardened with heat at 60° C. for 72 hours.

The thus obtained medium was slit to a ½ inch width to prepare a sample tape of Example 1.

Using the copolymers having a dialkylaminoalkyl group as shown in Table 1, samples of Examples 2 through 6 and Comparative Examples 1 and 2 were prepared in the same manner as in the preparation of the sample of Example 1. The results of evaluation on these samples are shown in Table 2.

The evaluation was made in the following manner.

Video S/N

Using a video tape recorder "NV8310", a trade name, manufactured by Matsushita Electric Industrial Co., Ltd., grey signals at 50% set up were recorded and noise was measured by an S/N meter "Model 925C", manufactured by Shibasoku Co., Ltd. Video S/N values are in terms of the relative values when the S/N of Example 1 is 0 dB.

Kinetic Friction Coefficient

Using the above video tape recorder, the friction coefficient was indicated in terms of μ value calculated by the following equation:

$$T_2/T_1 = exp(\mu^* \pi)$$

wherein $T_1$ is a tape tension at the supply side of the rotary cylinder of VTR, and $T_2$ is a tape tension at the take-up side of the rotary cylinder thereof. This evaluation was done at 23° C. and 65%RH.

Charging Electric Potential

When a tape was running on the above described video tape recorder, charging electric potential of the tape at the outlet of the rotary cylinder was measured.

Number of Drop Outs

After a tape was running for 100 passes on the above described video tape recorder, the number of drop outs for $14 \times 10^{-6}$ second or more was counted per 1 minute using a drop out counter "VD-3D", a trade name, manufactured by Victor Company of Japan Ltd.

Storage Stability

After a magnetic coating composition was allowed to stand still at room temperature for 24 hours and thereafter stirred for 10 minutes, and a magnetic tape was prepared in the same manner as in Example 1, the video S/N was measured and is shown in terms of a relative value when video S/N of the sample which had not been stored is 0 dB.

TABLE 1

| Example | Vinyl compound having dialkylaminoalkyl group | (wt %) | Copolymer | (wt %) |
|---|---|---|---|---|
| 1 |  | 20 | Ethylacrylate<br>Vinyl acetate | 75<br>5 |
| 2 | 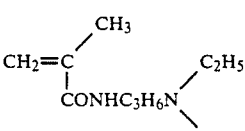 | 30 | Butyl acrylate<br>Hydroxyethyl-methacrylate | 65<br>5 |
| 3 | 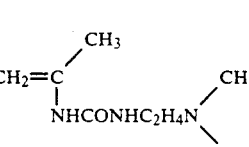 | 20 | Methylmethacrylate<br>Vinyl acetate | 75<br>5 |
| 4 | 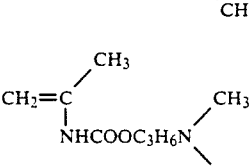 | 20 | Ethylacrylate<br>Vinyl acetate | 75<br>5 |

TABLE 1-continued

| | Vinyl compound having dialkylaminoalkyl group | (wt %) | Copolymer | (wt %) |
|---|---|---|---|---|
| 5 | $CH_2=CH-CONHC_3H_6N(CH_3)(CH_3)$ | 40 | Ethylacrylate<br>Styrene | 55<br>5 |
| 6 | " | 50 | Hexylacrylate<br>Butylmethacrylate | 45<br>5 |
| Comparative Example 1 | none | — | Ethylacrylate<br>Vinyl acetate | 90<br>5 |
| Comparative Example 2 | $CH_2=CH-CON(CH_3)(CH_3)$ | 20 | Ethylacrylate<br>Vinyl acetate | 75<br>5 |

TABLE 2

| Sample | Video S/N (dB) | Kinetic friction coefficient | Changing potential (Volts) | Number of drop outs | Storage stability (dB) |
|---|---|---|---|---|---|
| Example | | | | | |
| 1 | −0.5 | 0.27 | +5 | 9 | −0.5 |
| 2 | 0 | 0.24 | +5 | 7 | −1.5 |
| 3 | −0.5 | 0.26 | −15 | 14 | −1.2 |
| 4 | −0.2 | 0.25 | −10 | 15 | −0.3 |
| 5 | +0.4 | 0.25 | +20 | 10 | −0.3 |
| 6 | −0.3 | 0.26 | +10 | 12 | −0.5 |
| Comparative Example | | | | | |
| 1 | −2.0 | 0.31 | −150 | 63 | −3.0 |
| 2 | −2.5 | 0.33 | −110 | 51 | −2.0 |

EXAMPLES 7 to 12 AND COMPARATIVE EXAMPLES 3 AND 4

The magnetic coating composition having the following formulation was mixed and kneaded in a ball mill for 50 hours.

| | |
|---|---|
| Ferromagnetic Fe alloy particles (Coercive force 1500 Oe, BET specific surface area 50 m²/g) | 100 parts |
| Vinyl chloride type copolymer (see Table 3) | 10 parts |
| Polyurethane resin ("N2304" manufactured by Nippon Polyurethane Co., Ltd.) | 6 parts |
| Butyl stearate | 1 part |
| Al₂O₃ (average particle size 0.50 μm) | 2 parts |
| Carbon Black (average particle size 30 mμ) | 2 parts |
| Methyl ethyl ketone | 100 parts |
| Toluene | 120 parts |

After the magnetic coating composition was mixed and kneaded, 5 parts of "Collonate L", a trade name of polyisocyanate, manufactured by Nippon Polyurethane Co., Ltd. was added to the composition and further mixed and kneaded in a ball mill for 10 minutes, and the resulting magnetic coating composition was coated onto a polyethylene terephthalate support having a 10 μm thickness using a doctor blade so that the dry thickness of the magnetic layer was 4 μm. The magnetic layer was subjected to orientation using cobalt magnets, and after the solvents were dried, the magnetic layer was subjected to a calendering treatment and then hardened with heat at 60° C. for 72 hours. The resulting magnetic recording medium was slit to a ½ inch width to prepare a sample tape of Example 7.

Using a vinyl chloride type copolymer as shown in Table 3, samples of Examples 8 to 12 and Comparative Examples of 3 and 4 were prepared in the same manner as in the preparation of the sample of Example 7. The results of evaluation on those samples are shown in Table 4.

The evaluation was made in the same manner as in Example 1.

TABLE 3

| | Vinyl chloride (wt %) | Alkylaminoalkyl compound | (wt %) | Third component | (wt %) |
|---|---|---|---|---|---|
| Comparative Example 3 | 92 | $CH_2=CH-CO_2C_2H_4N(CH_3)(CH_3)$ | 0 | Vinyl acetate<br>Maleic acid | 5<br>3 |
| Example 7 | 90 | $CH_2=CH-CONHC_3H_6N(CH_3)(CH_3)$ | 2 | Vinyl acetate<br>Maleic acid | 5<br>3 |

TABLE 3-continued

| | Vinyl chloride (wt %) | Alkylaminoalkyl compound | (wt %) | Third component | (wt %) |
|---|---|---|---|---|---|
| 8 | 90 | $CH_2=C\begin{matrix}CH_3\\CONHC_3H_6N\end{matrix}\begin{matrix}C_2H_5\\C_2H_5\end{matrix}$ | 2 | Vinyl acetate Maleic acid | 5 3 |
| 9 | 90 | $CH_2=C-CH_3$ <br> $\quad\vert$ <br> $NHCONHC_2H_4N\begin{matrix}CH_3\\CH_3\end{matrix}$ | 2 | Vinyl acetate Maleic acid | 5 3 |
| 10 | 90 | $CH_2=C-CH_3$ <br> $\quad\vert$ <br> $NHCO_2C_3H_6N\begin{matrix}CH_3\\CH_3\end{matrix}$ | 2 | Vinyl acetate Maleic acid | 5 3 |
| 11 | 89 | $CH_2=CH$ <br> $\quad\vert$ <br> $CONHC_3H_6N\begin{matrix}CH_3\\CH_3\end{matrix}$ | 5 | Vinyl acetate Maleic acid | 4 2 |
| 12 | 90.5 | " | 0.5 | Vinyl acetate Maleic acid | 6 3 |
| Comparative Example 4 | 92 | $CH_2=CH$ <br> $\quad\vert$ <br> $CON\begin{matrix}CH_3\\CH_3\end{matrix}$ | 2 | Vinyl acetate Maleic acid | 5 3 |

TABLE 4

| Sample | Video S/N (dB) | Kinetic friction coefficient | Changing potential (Volts) | Number of drop outs |
|---|---|---|---|---|
| Example | | | | |
| 7 | +0.5 | 0.24 | +2 | 7 |
| 8 | −0.2 | 0.26 | −8 | 10 |
| 9 | −0.3 | 0.26 | −10 | 12 |
| 10 | −0.2 | 0.27 | −12 | 11 |
| 11 | +0.4 | 0.26 | +10 | 10 |
| 12 | −0.4 | 0.27 | −7 | 15 |
| Comparative Example | | | | |
| 3 | −1.8 | 0.32 | −150 | 65 |
| 4 | −1.5 | 0.31 | −110 | 43 |

It can be understood form the results shown in Tables 2 and 4 that the magnetic recording medium of the present invention exhibits excellent electromagnetic characteristics. Charging caused by friction is reduced upon running a tape. Therefore, dust and contaminants attached to a surface of a magnetic layer can also be reduced, increase in drop outs is also reduced and kinetic friction coefficient is low. The magnetic coating composition used in this invention also has excellent storage stability. Thus, the magnetic recording medium of the present invention is practical and very useful.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing ferromagnetic particles dispersed in a binder, wherein said binder comprises a copolymer comprising at least one vinyl compound having a dialkylaminoalkyl group and at least one copolymerizable vinyl monomer capable of being copolymerized with said vinyl compound, wherein said at least one vinyl compound containing a dialkylaminoalkyl group is selected from the compounds represented by formula (I):

$$CH_2=\underset{\underset{R_2}{\overset{\displaystyle X(CH_2)_nN}{\vert}}}{\overset{\displaystyle R_3}{\underset{\vert}{C}}}\begin{matrix}R_1\\\vert\\\end{matrix} \quad (I)$$

wherein n represents an integer of from 1 to 4;
R₁ and R₂ each represents a hydrogen atom or an alkyl group having from 1 to 6 carbon atoms;
X represents —CONH—, —NHCONH—, or —NHCO₂—; and
R₃ represents a hydrogen atom or a methyl group.

2. A magnetic recording medium as claimed in claim 1, wherein said copolymer comprises said at least one vinyl compound, said at least one copolymerizable vinyl monomer, and vinyl chloride.

3. A magnetic recording medium as claimed in claim 1, wherein said binder comprises said copolymer, a vinyl chloride type copolymer, and a urethane type polymer.

4. A magnetic recording medium as claimed in claim 1, wherein said copolymerizable vinyl monomer is selected from the group consisting of vinyl acetate, vinyl alcohol, maleic acid, maleic anhydride, acrylic acid, acrylates, methacrylic acid, methacrylates, esters of acrylic acid or methacryic acid containing a glycidyl group, acrylonitrilie, vinylidene chloride, and vinyl propionate.

5. A magnetic recording medium as claimed in claim 1, wherein said copolymer is contained in an amount of from 5 to 90 wt% based on the total amount of said binder.

6. A magnetic recording medium as claimed in claim 2, wherein said binder further comprises a polyurethane resin, a polyester resin, or an acrylonitrile/butadiene copolymer.

7. A magnetic recording medium as claimed in claim 1, wherein said magnetic layer further comprises a crosslinking agent.

8. A magnetic recording medium as claimed in claim 1, wherein said copolymer has an average molecular weight of about from 10,000 to 50,000.

9. A magnetic recording medium as claimed in claim 1, wherein said vinyl compound containing a dialkyl-aminoalkyl group is contained in said copolymer in an amount of from 0.5 to 50 wt% based on the amount of said copolymer.

10. A magnetic recording medium as claimed in claim 2, wherein said vinyl chloride is contained in said copolymer in an amount of from 75 to 98 wt% based on the amount of said copolymer.

11. A magnetic recording medium as claimed in claim 2, wherein said vinyl compound containing a dialkyl-aminoalkyl group is contained in said copolymer in an amount of from 0.01 to 15 wt% based on the amount of said copolymer.

12. A magnetic recording medium as claimed in claim 2, wherein said copolymerizable vinyl monomer is contained in said copolymer in an amount of from 0.5 to 20 wt% based on the amount of said copolymer.

13. A magnetic recording medium as claimed in claim 1, wherein X in formula (I) represents —CONH—.

14. A magnetic recording medium as claimed in claim 1, wherein said vinyl compound containing a dialkyl-aminoalkyl group is contained in said copolymer in an amount of from 0.2 to 30 wt% based on the amount of said copolymer.

15. A magnetic recording medium as claimed in claim 2, wherein said vinyl compound containing a dialkyl-aminoalkyl group is contained in said copolymer in an amount of form 0.5 to 5 wt% based on the amount of said copolymer.

* * * * *